UNITED STATES PATENT OFFICE.

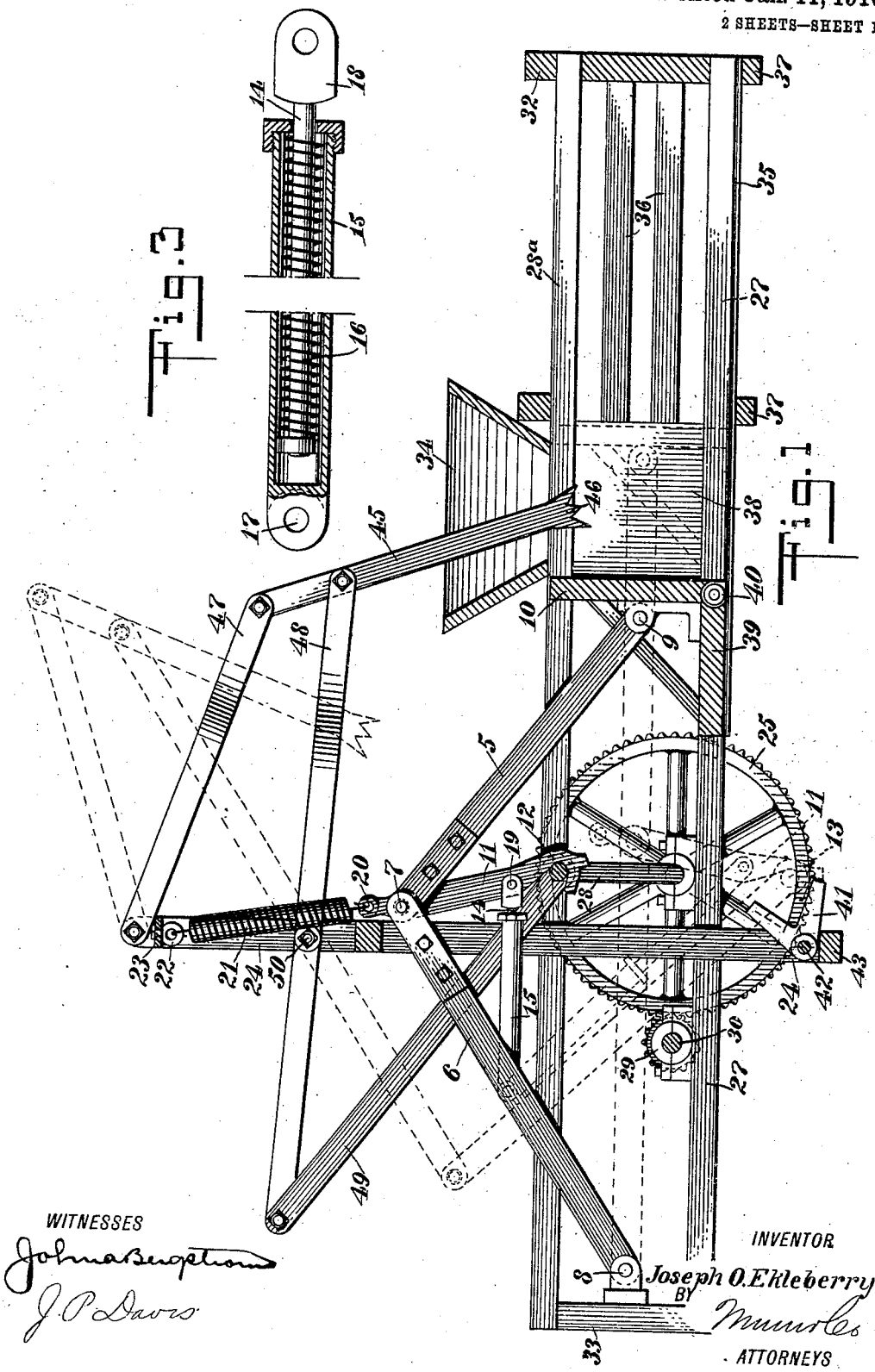

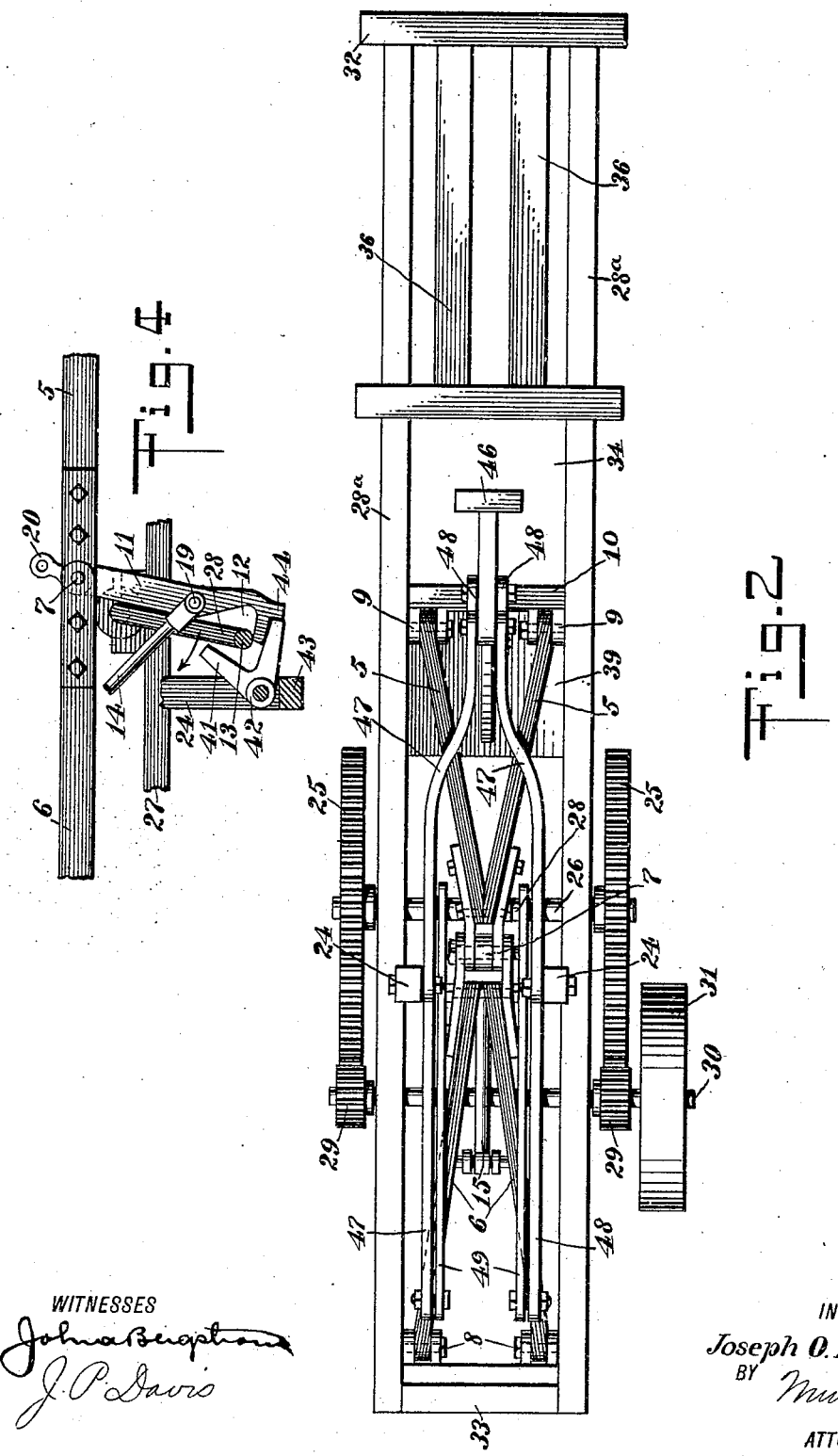

JOSEPH O. EKLEBERRY, OF UPPER SANDUSKY, OHIO, ASSIGNOR OF ONE-HALF TO LEONARD R. MILUM, OF UPPER SANDUSKY, OHIO.

BALING-PRESS.

946,209.  Specification of Letters Patent.  Patented Jan. 11, 1910.

Application filed May 4, 1909. Serial No. 493,804.

*To all whom it may concern:*

Be it known that I, JOSEPH O. EKLEBERRY, a citizen of the United States, and resident of Upper Sandusky, in the county of Wyandot and State of Ohio, have invented a certain new and useful Baling-Press, of which the following is a full, clear, and exact description.

Among the principal objects which this invention has in view are: to provide a mechanism for pressing hay or other like substances by successive steps and with a maximum pressure; to provide a mechanism wherein the return of the pressure mechanism to the receiving position is rapid; to provide means whereby the material being handled by this device is fed in unison with the pressure mechanism; to provide means whereby the pressure mechanism is positively returned to its initial position; and to provide a suitable driving mechanism which will operate constantly and with maximum power.

One embodiment of the invention is shown in the accompanying drawings wherein like characters of reference indicate corresponding parts in all the views.

Figure 1 is a longitudinal section of a baling press constructed in accordance with my invention; Fig. 2 is a plan view of the same; Fig. 3 is an enlarged detail view in longitudinal section, of a spring-actuated rod for returning the power engaging device to its normal position on being released; and Fig. 4 is a detail view in diagrammatic arrangement, showing the operative position of the power engaging member when arrested to be disengaged from the crank pin of the power mechanism.

The mechanism shown herein is designed with especial reference to disengaging the pressure mechanism from the power mechanism, immediately after the full pressure has been exerted by the said pressure mechanism.

The pressure mechanism consists primarily of two arms 5 and 6, pivotally connected upon a shaft 7. The arm 6 is pivotally connected to the frame at 8, while the arm 5 is pivotally connected to a pressure head at 9. The pivotal connection 8 is stationary, while the pivotal connection 9 moves in a straight line in which is guided a plunger head 10. The pivotal connection 7 is drawn to the straight line between the pivotal points 8 and 9, by means of a link or engaging arm 11, provided at its lower end with a hooklike construction 12, which is normally held in the path of the crank pin 13 of the power mechanism. The arm 11 is thus held in the path of the crank pin 13 by a rod 14, which is mounted in a housing 15 and is retracted therein by a spring 16; the rod 14 is extended by compressing this spring 16. The housing 15 is provided with a perforation 17 whereby it is pivotally mounted upon the arm 6. By the action of the spring 16 the rod 14 is retracted within the housing 15 until the head 18 which is pivotally connected at 19, with the arm 11, strikes upon the housing. Through the action of the spring 16 the relation between the arm 6 and the arm 11 becomes fixed.

The arm 11 is provided at the upper end and beyond the pivot 7 with a perforated extension 20, to which is connected one end of a heavy coil expansion spring 21. The opposite end of the spring 21 is secured in an eye bolt 22 mounted on a cross head 23 extended between the stanchions 24 of the frame of the press.

The function of the spring 21 is to raise the arms 11, 5 and 6 to the position shown in Fig. 1 of the drawings. It is prevented from raising the said arms further, by the head 18 of the rod 14 coming into contact with the housing 15. The triangular relation between the arms 11 and 6 and the housing 15 being fixed and the head 10 being movable only in a straight line, it becomes impossible to raise the junction of the arms 5 and 6 further.

The power mechanism employed in the present invention comprises two large cog wheels 25, 25, which are mounted on either end of a shaft 26 extending through the frame of the press and provided with bearings upon the side rails 27 of the press. Between the rails 27 the shaft 26 is shaped to form a crank arm 28, across the upper loop of which is formed the crank pin 13. The cog wheels 25, 25, are in tooth engagement with pinions 29, 29, mounted upon a shaft 30 whereon is likewise mounted a driving pulley 31 which receives a driving belt from the power source.

The frame within which the press is mounted and guided, consists of lower rails 27 and upper rails 28ª, these rails being placed at the four corners of the box-like extension of the frame, and suitably framed at the forward and rear ends thereof. At the forward end a head 32 is preferably constructed in solid form, and a head 33 at what is termed the rear end, may be formed in any suitable manner.

Just forward of the retracted position of the head 10 is placed a hopper 34, which is of ordinary construction, and adapted to deliver material upon a supporting floor 35. The floor 35 may be a solid structure, or slatted as shown at 36 on the sides of the frame forward of the hopper 34. The top of the runway is similarly constructed. The bottom 35 is preferably slidably mounted in cross braces 37, 37, whereby after a bale is pressed the floor 35 may be retracted so as to permit the bale to pass out of the frame. In the immediate vicinity of the hopper 34, the sides of the frame are formed from solid cheek pieces 38.

The head 10 is provided with a horizontal tail piece 39, the office of which is to maintain the head 10 in a vertical position. The head 10 is also provided with rollers 40 which track upon the bottom 35 of the frame.

With a structure having the pressure mechanism and the power mechanism as thus described, the operation is as follows: The wheels 25 are driven by the pinions 29, they in turn receiving their motive power from the power source through the pulley 31. The wheels 25 in turning carry the crank arms 28 and the crank pin 13 with them. When the crank pin 13 is brought in contact with the arm 11 it engages the hook 12. Continuing the rotary direction of the wheel 25, the pin 13 compels the arm 11 to travel with it until the pin 13 is carried from the top of the wheel 25 to the bottom thereof, or to the position shown in dotted lines in Fig. 1 of the drawings. As the arm 11 assumes the position shown in dotted lines, the two arms 5 and 6 have been drawn downward to assume the straight position shown in dotted lines in said Fig. 1. The arms 5, 6 and 11 having arrived at the position shown in dotted lines in Fig. 1, it is the purpose of the present mechanism that the said members should resume the initial position shown in full lines in Fig. 1, without waiting upon the slower movement of the crank pin 13. When the above-mentioned members have assumed the position shown in dotted lines, the coil spring 21 has been extended under tension. If now the arm 11 be disengaged from the crank pin, the said spring would immediately raise the pivotal connection 7 of the arms 5 and 6 to the position shown in full lines and this without waiting upon the slower motion of the crank arms 28. In bringing the arms 5 and 6 to the position mentioned, the head 10 is retracted to the position shown in full lines in Fig. 1 and to the rear of the hopper 34. In each advance of the head 10 it is carried to the position shown in dotted lines to the forward side of the hopper 34. If desired, the head 10 may be provided with a rearward extension at the top, which would close the bottom of the hopper 34 when the said head was in the advanced or extended position.

It is to release the arm 11 from engagement with the pin 13 that I have provided the trip 41. The trip 41 is pivotally mounted at 42 on the stanchions 24, and is provided with two arms set at an angle one to the other. A cross beam 43 is so disposed with reference to the trip 41 that when the lower arm thereof is in position to interpose in the rotary path of the head 44 of the arm 11, the arm rests upon the cross beam 43 while the other arm of the said trip extends above and into the rotary path of the crank pin 13. The result of this construction is that when the arm 11 is brought into contact with the trip 41 it is arrested, while the crank arm 28 with the pin 13 continues its rotary action. The arm 11 being thus disengaged from the pin 13, the coil spring 21 is permitted to raise the arms 5 and 6 to the initial position shown in full lines of Fig. 1.

The upper arm of the trip 41 is provided as a safeguard against the arms 5 and 6 becoming jammed and in such position overcoming the spring 21. Should this happen where the construction is such as described, the upper arm of the trip is moved by the crank pin 13 to rotate the trip. The lower arm of the trip rests under the forward extension of the hook 12 in engaging the head 44, and should the parts become jammed as above stated, the lower arm of the trip would remain in such engagement. When now the crank pin impinges upon the upper arm of the trip 41 and causes the trip to rotate, the lower arm raises the arm 11 and with it the joined ends of the arms 5 and 6, permitting the spring 21 to quickly return the pressure members to their initial position. By means of this construction, the arms 5 and 6 and the head 10 resume their initial position much more rapidly than if they were carried to such position, by the rotation of the wheel 25. By means of this action wherein the pressure members are returned by the spring 21, the loading of the material through the hopper may proceed more deliberately than it otherwise would.

The material after being placed manually in the hopper, is ejected from the hopper in front of the head 10 by means of a mechanism which I herein term the feeding mechanism, which consists primarily of the plunger 45. This plunger 45 is provided with a forked end 46, and is pivotally connected to two arms 47 and 48, which are pivotally mounted on the stanchions 24. The arm 48 is extended to the rear of the said stanchions and is pivotally connected to a connecting rod 49, which in turn is pivotally mounted upon the crank pin 13.

By the rotary movement of the crank pin 13 about the center of the wheel 25, the lower end of the connecting rod 49 is carried on the same path, while the upper end of the same is compelled to travel in a curved path about a pivotal connection 50, whereby the arm 48 is pivotally mounted upon the said stanchions. The depressing of the one end of the arm 48 raises the other, which carries the plunger 45 upward carrying the arm 47. The two arms 47 and 48 being pivotally connected to the fixed stanchions 24 and to the movable plunger 45, causes the plunger 45 to assume the position shown in dotted lines in Fig. 1 of the drawings.

The position of the feeding mechanism, shown by dotted lines, is assumed during the compression of the material being handled by the head 10, and it is during this compression that the said material is placed in the hopper 34 from which the plunger 45 has been withdrawn. When now the spring 21 operates to return the pressure mechanism to its initial position, the plunger 45 is retained in the position shown in dotted lines, due to the fact that the parts constituting the feeding mechanism are permanently attached to the power mechanism or to the crank pin 13, to move therewith. Hence in the mechanism above described, we have a coöperation between the pressing mechanism and the feeding mechanism, that operate in timed relation as follows: When the pressure mechanism is being moved forward against the material which has been placed in front of the head 10, the plunger 45 is being retracted from the hopper 34. When the pressure mechanism has reached its point of maximum pressure as shown by the dotted lines in Fig. 1, the feeding mechanism including the plunger 45, has been brought to the position shown in dotted lines in Fig. 1. Immediately succeeding this position of the parts as above explained, the pressure mechanism is disengaged from the power mechanism and assumes the position shown in full lines in Fig. 1, while the feeding mechanism remains in the position shown in dotted lines in said figure. From this point the pressure mechanism remains quiescent until the crank pin 13 reaches the highest point in its rotary path, where it again engages the hook 11 and thereby the pressure mechanism. In the meantime, the feeding mechanism has been gradually brought to the position shown in full lines in Fig. 1, and this has permitted the manual deposit into the hopper of the desired amount of the material being handled. This material is ejected from the hopper by the plunger 45 which passes through the same. From the point when the crank pin 13 reengaged the hook 12, and the head 10 starts forward on its pressure stroke, the plunger 45 starts to retract and is moved to the position shown in dotted lines in Fig. 1, while the plunger 10 is carried forward to the position shown in dotted lines in the same figure.

There is no interference between the two mechanisms which operate in unison, but during a portion of the coöperation they are operating out of time each to the other.

Having thus described my invention, I claim as new and desire to secure by Letters Patent:

1. A baling press, comprising a plunger head adapted to press the material being handled, a plurality of arms pivotally connected for advancing said plunger head, a power mechanism embodying a rotary shaft having an engaging member extended therefrom, a connecting arm attached to said first-mentioned arms, said connecting arm having a hook to engage said extended member of the shaft, a trip having two arms, the one to extend into the path of the said hook to arrest the same, and the other arm into the path of the said extended member to lift the said connecting arm after disengagement, means for raising the said first-mentioned arms, embodying a spring-actuated mechanism, and means for rotating the said shaft.

2. A baling press comprising a driving mechanism embodying a rotary crank shaft having a crank arm; a pressing mechanism embodying a movable plunger; a feeding mechanism adapted to insert material being handled in the path of said plunger said feeding mechanism being permanently secured to the said crank of the driving mechanism to be regularly operated thereby; a connecting device mounted upon said pressing mechanism and adapted to be temporarily engaged by the said crank of the driving mechanism; means for disengaging the said connecting device from the said crank when the said plunger has been advanced to the limit of its pressing stroke; and means other than the said driving mechanism for returning the said plunger to its initial position.

3. A baling press, comprising a hopper to receive the material being handled; a pressing mechanism embodying a movable plunger adapted to press the material when delivered through said hopper; a reciprocating arm adapted to extend into said hopper to eject the material contained therein; a driving mechanism embodying a crank shaft having a crank arm; connecting devices for connecting the said reciprocating arm with the said crank arm to be held in permanent engagement therewith; a connecting device mounted upon the said pressing mechanism adapted to be temporarily engaged by the said crank arm; means for disengaging the said connecting device from the said crank arm when the said crank arm is in position to advance the said plunger to the limit of its pressing stroke; and means for returning the said plunger to its initial position to receive the said material being handled.

4. A baling press, comprising a pressing mechanism adapted to be reciprocated, a feed hopper suitably located in advance of the retracted portion of the said pressing mechanism, a feeding mechanism embodying an arm adapted to extend into said hopper to force the material contained therein into the path of the said pressing mechanism, a driving mechanism for said pressing and feeding mechanisms, adapted to operate the said feeding mechanism to advance and retract the said arm thereof at an even rate of speed, and adapted to operate the said pressing mechanism in a forward direction only and alternately with the said feeding mechanism, and a separate retracting mechanism to withdraw the said pressing mechanism at a speed greater than the advance by the said driving mechanism.

In testimony whereof I have signed my name to this specification in the presence of two subscribing witnesses.

JOSEPH O. EKLEBERRY.

Witnesses:
JOSEPH FLECK,
F. J. STALTER.